JUSTICE & GALBREATH.
Cotton-Planter.
No. 17,221. Patented May 5. 1857.
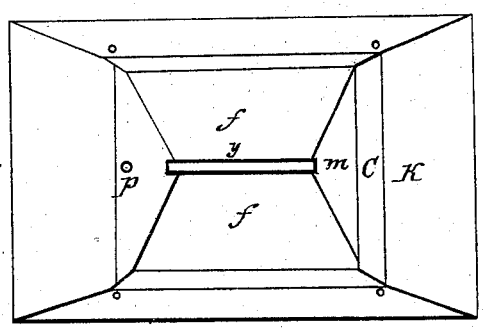
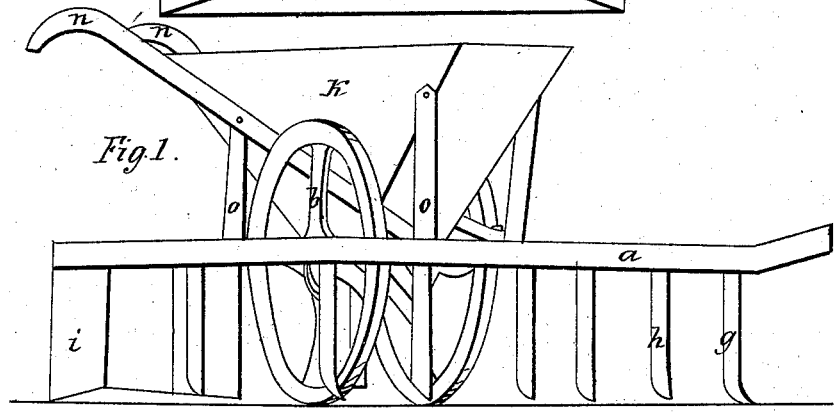
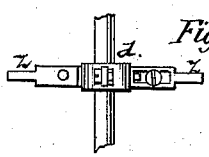
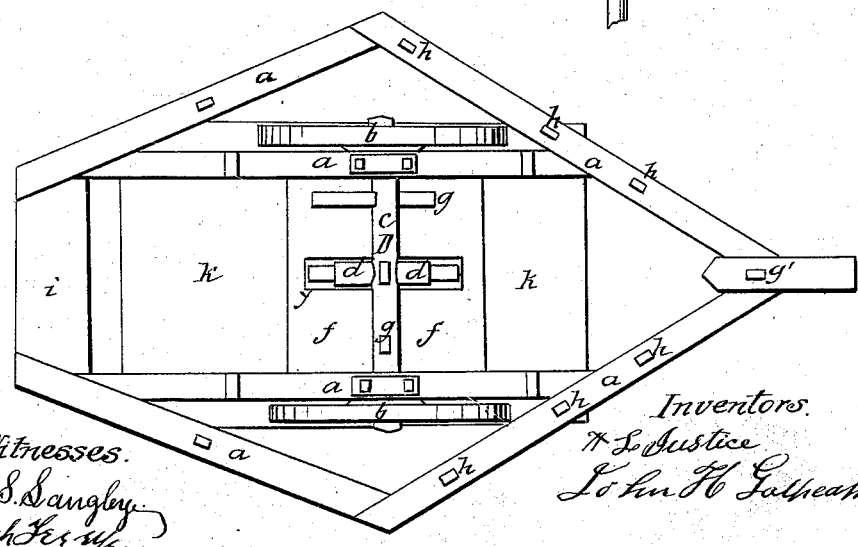
Witnesses.
A. S. Langley
Josiah Ferry
Inventors.
N. L. Justice
John H. Galbreath

UNITED STATES PATENT OFFICE.

H. L. JUSTICE AND JOHN H. GALBREATH, OF GOODLETTSVILLE, TENN.

IMPROVEMENT IN COTTON-SEED PLANTERS.

Specification forming part of Letters Patent No. 17,221, dated May 5, 1857.

*To all whom it may concern:*

Be it known that we, HENRY L. JUSTICE and JOHN H. GALBREATH, both of Goodlettsville, in the county of Davidson and State of Tennessee, have invented a new and useful Machine for Planting Cotton-Seed; and we do hereby declare that the following is a full, clear, and exact description of the same, reference being had to the annexed drawings, in which—

Figure 1 is a perspective elevation; Fig. 2, the ground plan; Fig. 3, the hopper, and Fig. 4 a top view of the rag-wheel $d$ with its adjustable arms $z$.

The nature of our invention consists in combining with relation to the movable hopper of a cotton-seed planter a rag-wheel having adjustable arms, in the manner hereinafter described.

To enable others skilled in the art to make and use our invention, we will proceed to describe its construction and operation.

To a frame shaped like an ordinary harrow-frame with wheels attached, (marked $b$,) revolving upon a shaft, (marked $c$,) is placed a rag or spur wheel, $d$, having adjustable arms $z$, that work in a slot, $y\ m$, in the under part of hopper $f$, for the purpose of loosening and drawing out more or less of the seed from the same, as may be desired. Arms or cams $g$ are also placed upon shaft $c$ to give a vibrating motion to the lower hopper, $f$.

$g'$ is an opening-plow in the front of frame $a$; $h$, harrow-teeth; $i$, drag or coverer; K, upper hopper; C, middle hopper. Hoppers K and C are immovable upon the frame $a$, hopper $f$ being movable to allow of its being shaken sufficiently by cams $g$ to allow the seed to pass freely through the slot or opening at its bottom, (marked $m\ y$;) W, handles of the machine; $o$, supports of hopper K; $p$, screw by which hopper $f$ is attached to hopper K.

Having described our invention, what we claim as new, and desire to secure by Letters Patent, is—

The combination of rag-wheel $d$, having adjustable arms $z$, with the movable hopper $f$ of a cotton-seed planter, the whole being arranged and operated in the manner set forth.

H. L. JUSTICE.
  JOHN H. GALBREATH.

Witnesses:
 A. S. LANGLEY,
 JOSIAH FERRISS.